United States Patent
Koenig et al.

(10) Patent No.: US 10,452,656 B2
(45) Date of Patent: Oct. 22, 2019

(54) DEEP FILTER PROPAGATION USING EXPLICIT DEPENDENCY AND EQUIVALENCY DECLARATIONS IN A DATA MODEL

(71) Applicant: SAP SE, Walldorf (DE)

(72) Inventors: Edgardo Gildo Koenig, Leimen (DE); Steffen Siegmund, St. Leon-Rot (DE); Arndt Effern, Sinsheim-Duehren (DE); Guenter Briam, Wiesloch (DE)

(73) Assignee: SAP SE, Walldorf (DE)

( * ) Notice: Subject to any disclaimer, the term of this patent is extended or adjusted under 35 U.S.C. 154(b) by 759 days.

(21) Appl. No.: 15/086,733

(22) Filed: Mar. 31, 2016

(65) Prior Publication Data
US 2017/0286482 A1   Oct. 5, 2017

(51) Int. Cl.
*G06F 16/21* (2019.01)
*G06F 16/2453* (2019.01)
*G06F 16/22* (2019.01)
*G06F 16/2455* (2019.01)

(52) U.S. Cl.
CPC ...... *G06F 16/24534* (2019.01); *G06F 16/212* (2019.01); *G06F 16/221* (2019.01); *G06F 16/2455* (2019.01); *G06F 16/24542* (2019.01)

(58) Field of Classification Search
CPC .. G06F 16/24–24545; G06F 17/30442–30469; G06F 16/212
See application file for complete search history.

(56) References Cited

U.S. PATENT DOCUMENTS

| | | | | |
|---|---|---|---|---|
| 5,469,568 A | * | 11/1995 | Schiefer | G06F 17/30469 |
| 5,600,829 A | * | 2/1997 | Tsatalos | G06F 17/30451 |
| 5,619,692 A | * | 4/1997 | Malkemus | G06F 17/30436 |
| 5,659,728 A | * | 8/1997 | Bhargava | G06F 17/30448 |
| 6,021,405 A | * | 2/2000 | Celis | G06F 17/30463 |
| 6,438,741 B1 | | 8/2002 | Al-omari et al. | |
| 6,694,310 B1 | * | 2/2004 | Yu | G06F 17/30463 707/718 |
| 6,775,676 B1 | | 8/2004 | Briam et al. | |
| 6,865,567 B1 | * | 3/2005 | Oommen | G06F 17/30463 |
| 7,080,062 B1 | * | 7/2006 | Leung | G06F 17/30463 |
| 7,461,097 B2 | | 12/2008 | Stahl et al. | |

(Continued)

OTHER PUBLICATIONS

Communication form European Patent Office and European Search Report for EP Patent Application No. 16002471.7-1507; dated Jun. 27, 2017; 8 pages.

*Primary Examiner* — Robert W Beausoliel, Jr.
*Assistant Examiner* — Nirav K Khakhar
(74) *Attorney, Agent, or Firm* — Fish & Richardson P.C.

(57) ABSTRACT

The disclosure generally describes methods, software, and systems, including a method for defining and using dependencies and equivalences for data elements in the data model in order to improve query efficiency. At design time of a data model, dependencies and equivalences for data elements in the data model are received over a computer network. The dependencies and equivalences are stored in persistent storage with the data model. A request is received over the computer network, the request to be executed to obtain results from a database associated with the data model. An optimized query is generated using the received request and the dependencies and equivalences. The optimized query is optimized relative to the received request.

20 Claims, 15 Drawing Sheets

(56) References Cited

U.S. PATENT DOCUMENTS

| | | | |
|---|---|---|---|
| 7,774,318 B2 | 8/2010 | Effern | |
| 7,904,487 B2* | 3/2011 | Ghatare | G06F 17/30427 |
| | | | 707/756 |
| 8,886,596 B2 | 11/2014 | Effern et al. | |
| 9,207,998 B2 | 12/2015 | Rapp et al. | |
| 2005/0210023 A1* | 9/2005 | Barrera | G06F 17/30454 |
| 2011/0131199 A1* | 6/2011 | Simon | G06F 17/30463 |
| | | | 707/714 |
| 2011/0137890 A1* | 6/2011 | Bestgen | G06F 17/30466 |
| | | | 707/719 |
| 2011/0153593 A1* | 6/2011 | Zhou | G06F 17/30454 |
| | | | 707/718 |
| 2013/0311444 A1* | 11/2013 | Samwel | G06F 17/30466 |
| | | | 707/714 |
| 2015/0142773 A1 | 5/2015 | Mindnich et al. | |
| 2016/0140197 A1* | 5/2016 | Gast | G06F 17/30575 |
| | | | 707/626 |
| 2016/0335318 A1* | 11/2016 | Gerweck | G06F 16/2282 |

* cited by examiner

200

```
/* Create a data model EXAMPLE1
   lo_rds_join = me->mo_rds_processor->add_source_ansijoin(
     iv_id   = 'EXAMPLE1 ).

/* Specify data sources and join conditions
   lo_rds_join->add_source_plain(
     iv_source_name = 'SYS_STATISTICS.HOST_SQL_PLAN_CACH'
     iv_alias       = 'T1' ).

lo_rds_join->add_source_aggr(
     iv_source_name = 'SYS.M_EXPENSIVE_STATEMENTS'
     iv_alias       = 'T2' ).

lo_rds_join->add_join_condition(
     iv_order       = 1
     iv_kind        = 'LEFT OUTER JOIN'
     iv_left_alias  = 'T1'
     iv_right_alias = 'T2'
     iv_condition   = 'T1.HOST = T2.HOST AND T1.PORT = T2.PORT AND T1.STATEMENT_HASH
 = T2.STATEMENT_HASH'
     iv_dependencies = 'T1.HOST,T2.HOST,T1.PORT,T2.PORT,T1.STATEMENT_HASH,T2.STATE
MENT_HASH' ).

/* Specify charateristics
   lo_rds_join->use_field(
     iv_id    = 'SERVER_TIMESTAMP'
     iv_alias = 'T1' ).

lo_rds_join->use_field(
     iv_id    = 'HOST'
     iv_alias = 'T1' ).
```

*Continued from FIG. 2A*

```
lo_rds_join->use_field(
  iv_id   = 'PORT'
  iv_alias = 'T1' ).

lo_rds_join->use_field(
  iv_id   = 'PLAN_ID'
  iv_alias = 'T1' ).

lo_rds_join->use_field(
  iv_id   = 'STATEMENT_HASH'
  iv_alias = 'T1' )

lo_rds_join->add_characteristic(
  iv_id         = 'IS_EXPENSIVE'
  iv_db_type    = 'VARCHAR(5)'
  iv_label      = 'Expensive Stmt. Trace Exists'
  iv_expression = 'CASE WHEN IFNULL (T2.STATEMENT_HASH, "NULL") != "NULL" THEN "TRUE"
              ELSE "FALSE" END'
  iv_dependencies = 'T2.STATEMENT_HASH' ).

/* Specify metrics
  lo_rds_join->use_field(
    iv_id   = 'TOTAL_EXECUTION_TIME'
    iv_alias = 'T1' ).
```

```
/* Create a data model EXAMPLE1
  lo_rds_join = me->mo_rds_processor->add_source_ansijoin(
    iv_id   = 'EXAMPLE1 ).

/* Specify data sources and join conditions
  lo_rds_join->add_source_plain(
    iv_source_name = 'SYS_STATISTICS.HOST_SQL_PLAN_CACH'
    iv_alias       = 'T1' ).

lo_rds_join->add_source_aggr(
    iv_source_name = 'SYS.M_EXPENSIVE_STATEMENTS'
    iv_alias       = 'T2' ).

lo_rds_join->add_join_condition(
    iv_order       = 1
    iv_kind        = 'LEFT OUTER JOIN'
    iv_left_alias  = 'T1'
    iv_right_alias = 'T2'
    iv_condition   = 'T1.HOST = T2.HOST AND T1.PORT = T2.PORT AND T1.STATEMENT_HASH
 = T2.STATEMENT_HASH'
    iv_dependencies = 'T1.HOST,T2.HOST,T1.PORT,T2.PORT,T1.STATEMENT_HASH,T2.STATE
MENT_HASH' ).

/* Specify charateristics
  lo_rds_join->add_time(
    iv_id         = 'SERVER_TIMESTAMP'
    iv_db_type    = 'TIMESTAMP'
    iv_label      = 'Server Timestamp'
    iv_expression  = 'T1.SERVER_TIMESTAMP'
    iv_dependencies = 'T1.SERVER_TIMESTAMP' ).

lo_rds_join->add_equivalence(
    iv_id         = 'SERVER_TIMESTAMP'
    iv_equivalences = 'T1.SERVER_TIMESTAMP,T2.START_TIME' ).
```
} 302

```
  lo_rds_join->use_field(
    iv_id    = 'HOST'
    iv_alias = 'T1' ).
```

*Continued from FIG. 3A*

```
lo_rds_join->use_field(
   iv_id   = 'PORT'
   iv_alias = 'T1' ).

lo_rds_join->use_field(
   iv_id   = 'PLAN_ID'
   iv_alias = 'T1' ).

lo_rds_join->use_field(
   iv_id   = 'STATEMENT_HASH'
   iv_alias = 'T1' )

lo_rds_join->add_characteristic(
   iv_id        = 'IS_EXPENSIVE'
   iv_db_type   = 'VARCHAR(5)'
   iv_label     = 'Expensive Stmt. Trace Exists'
   iv_expression = 'CASE WHEN IFNULL (T2.STATEMENT_HASH, "NULL") != "NULL" THEN "TR
UE"
            ELSE "FALSE" END'
   iv_dependencies = 'T2.STATEMENT_HASH' ).

/* Specify metrics
   lo_rds_join->use_field(
      iv_id   = 'TOTAL_EXECUTION_TIME'
      iv_alias = 'T1' ).
```

```
SELECT
  /* RDS_SOURCE := DO_PROVIDER_SOURCE_BRIDGE */
  DATAPROV.STATEMENT_HASH AS STATEMENT_HASH
  ,DATAPROV.IS_EXPENSIVE AS IS_EXPENSIVE
  ,DATAPROV.TOTAL_EXECUTION_TIME AS TOTAL_EXECUTION_TIME
FROM
  (
  /* RDS_SOURCE := A$HLP_OPTIMIZATION_J1 */
  /* RDS_SOURCE := SQ_SOURCE_AGGR */
  SELECT
    /* RDS_SOURCE := SQ_EXC_AGGR */
    SQ_STD_AGGR.IS_EXPENSIVE AS IS_EXPENSIVE
    ,SQ_STD_AGGR.STATEMENT_HASH AS STATEMENT_HASH
    ,SUM( SQ_STD_AGGR.TOTAL_EXECUTION_TIME ) AS
TOTAL_EXECUTION_TIME
  FROM
    (
    SELECT
      /* RDS_SOURCE := SQ_STD_AGGR */
      SQ_SOURCE.IS_EXPENSIVE AS IS_EXPENSIVE
      ,SQ_SOURCE.SERVER_TIMESTAMP AS SERVER_TIMESTAMP
      ,SQ_SOURCE.STATEMENT_HASH AS STATEMENT_HASH
      ,SUM( SQ_SOURCE.TOTAL_EXECUTION_TIME ) AS
TOTAL_EXECUTION_TIME
    FROM
      (
      SELECT
        /* RDS_SOURCE := HLP_OPTIMIZATION_J1 */
        CASE WHEN IFNULL (T2.STATEMENT_HASH, 'NULL') != 'NULL'
THEN 'TRUE'
          ELSE 'FALSE' END AS IS_EXPENSIVE
        ,T1.SERVER_TIMESTAMP AS SERVER_TIMESTAMP
        ,T1.STATEMENT_HASH AS STATEMENT_HASH
        ,T1.TOTAL_EXECUTION_TIME AS TOTAL_EXECUTION_TIME
      FROM
        (
```

_Continued on FIG. 4B_

*Continued from FIG. 4A*
```
      /* RDS_SOURCE := TH_HOST_SQL_PLAN_CACHE */
      T.HOST AS HOST
      ,T.PORT AS PORT
      ,T.SERVER_TIMESTAMP AS SERVER_TIMESTAMP
      ,T.STATEMENT_HASH AS STATEMENT_HASH
      ,T.TOTAL_EXECUTION_TIME AS TOTAL_EXECUTION_TIME
    FROM
      _SYS_STATISTICS.HOST_SQL_PLAN_CACHE AS T /* RDS_SOURCE :=
TH_HOST_SQL_PLAN_CACHE */
    ) AS T1 /* RDS_SOURCE := TH_HOST_SQL_PLAN_CACHE */
    LEFT OUTER JOIN
    (
    SELECT
      /* RDS_SOURCE := A$TH_EXPENSIVE_STATEMENTS */
      AGGR_ACCESS.HOST AS HOST
      ,AGGR_ACCESS.PORT AS PORT
      ,AGGR_ACCESS.START_TIME AS START_TIME
      ,AGGR_ACCESS.STATEMENT_HASH AS STATEMENT_HASH
    FROM
      (
      /* RDS_SOURCE := SQ_SOURCE_WTS_AGGR_001 */
      /* RDS_SOURCE := SQ_STD_AGGR_000 */
      SELECT
        /* RDS_SOURCE := TH_EXPENSIVE_STATEMENTS */
        T.HOST AS HOST
        ,T.PORT AS PORT
        ,T.START_TIME AS START_TIME
        ,T.STATEMENT_HASH AS STATEMENT_HASH
      FROM
        SYS.M_EXPENSIVE_STATEMENTS AS T /* RDS_SOURCE :=
TH_EXPENSIVE_STATEMENTS */
      ) AS AGGR_ACCESS /* RDS_SOURCE := A$TH_EXPENSIVE_STATEMENTS */
    GROUP BY
      AGGR_ACCESS.HOST
      ,AGGR_ACCESS.PORT
      ,AGGR_ACCESS.START_TIME
      ,AGGR_ACCESS.STATEMENT_HASH
    ) AS T2 /* RDS_SOURCE := A$TH_EXPENSIVE_STATEMENTS */
    ON ( T1.HOST = T2.HOST AND T1.PORT = T2.PORT AND T1.STATEMENT_HASH =
T2.STATEMENT_HASH )
      WHERE ( T1.SERVER_TIMESTAMP >= CAST( '2015-11-24 10:26:00' AS TIMESTAMP )
        AND T1.SERVER_TIMESTAMP < CAST( '2015-11-25 10:26:31' AS TIMESTAMP ) )
    ) AS SQ_SOURCE /* RDS_SOURCE := SQ_STD_AGGR */
```
402 { (braces around the WHERE clause lines)

_Continued from FIG. 4B_
```
      SELECT
    GROUP BY
       SQ_SOURCE.IS_EXPENSIVE
       ,SQ_SOURCE.SERVER_TIMESTAMP
       ,SQ_SOURCE.STATEMENT_HASH
    ) AS SQ_STD_AGGR /* RDS_SOURCE :=
 SQ_EXC_AGGR */
   GROUP BY
      SQ_STD_AGGR.IS_EXPENSIVE
      ,SQ_STD_AGGR.STATEMENT_HASH
   ) AS DATAPROV /* RDS_SOURCE :=
 DO_PROVIDER_SOURCE_BRIDGE */
```

```
SELECT
  /* RDS_SOURCE := DO_PROVIDER_SOURCE_BRIDGE */
  DATAPROV.STATEMENT_HASH AS STATEMENT_HASH
  ,DATAPROV.IS_EXPENSIVE AS IS_EXPENSIVE
  ,DATAPROV.TOTAL_EXECUTION_TIME AS TOTAL_EXECUTION_TIME
FROM
  (
  /* RDS_SOURCE := A$HLP_OPTIMIZATION_J1 */
  /* RDS_SOURCE := SQ_SOURCE_AGGR */
  SELECT
    /* RDS_SOURCE := SQ_EXC_AGGR */
    SQ_STD_AGGR.IS_EXPENSIVE AS IS_EXPENSIVE
    ,SQ_STD_AGGR.STATEMENT_HASH AS STATEMENT_HASH
    ,SUM( SQ_STD_AGGR.TOTAL_EXECUTION_TIME ) AS
TOTAL_EXECUTION_TIME
  FROM
    (
    SELECT
      /* RDS_SOURCE := SQ_STD_AGGR */
      SQ_SOURCE.IS_EXPENSIVE AS IS_EXPENSIVE
      ,SQ_SOURCE.SERVER_TIMESTAMP AS SERVER_TIMESTAMP
      ,SQ_SOURCE.STATEMENT_HASH AS STATEMENT_HASH
      ,SUM( SQ_SOURCE.TOTAL_EXECUTION_TIME ) AS
TOTAL_EXECUTION_TIME
    FROM
      (
      SELECT
        /* RDS_SOURCE := HLP_OPTIMIZATION_J1 */
        CASE WHEN IFNULL (T2.STATEMENT_HASH, 'NULL') != 'NULL'
THEN 'TRUE'
            ELSE 'FALSE' END AS IS_EXPENSIVE
        ,T1.SERVER_TIMESTAMP AS SERVER_TIMESTAMP
        ,T1.STATEMENT_HASH AS STATEMENT_HASH
        ,T1.TOTAL_EXECUTION_TIME AS TOTAL_EXECUTION_TIME
      FROM
        (
```

*Continued from FIG. 5A*
```
/* RDS_SOURCE := TH_HOST_SQL_PLAN_CACHE */
T.HOST AS HOST
,T.PORT AS PORT
,T.SERVER_TIMESTAMP AS SERVER_TIMESTAMP
,T.STATEMENT_HASH AS STATEMENT_HASH
,T.TOTAL_EXECUTION_TIME AS TOTAL_EXECUTION_TIME
FROM
    _SYS_STATISTICS.HOST_SQL_PLAN_CACHE AS T /* RDS_SOURCE :=
TH_HOST_SQL_PLAN_CACHE */
    WHERE
502 {   ( T.SERVER_TIMESTAMP >= CAST( '2015-11-24 10:26:00' AS TIMESTAMP )
        AND T.SERVER_TIMESTAMP < CAST( '2015-11-25 10:26:31' AS TIMESTAMP ) )
) AS T1 /* RDS_SOURCE := TH_HOST_SQL_PLAN_CACHE */
LEFT OUTER JOIN
(
SELECT
   /* RDS_SOURCE := A$TH_EXPENSIVE_STATEMENTS */
   AGGR_ACCESS.HOST AS HOST
   ,AGGR_ACCESS.PORT AS PORT
   ,AGGR_ACCESS.START_TIME AS START_TIME
   ,AGGR_ACCESS.STATEMENT_HASH AS STATEMENT_HASH
FROM
   (
   /* RDS_SOURCE := SQ_SOURCE_WTS_AGGR_001 */
   /* RDS_SOURCE := SQ_STD_AGGR_000 */
   SELECT
     /* RDS_SOURCE := TH_EXPENSIVE_STATEMENTS */
     T.HOST AS HOST
     ,T.PORT AS PORT
     ,T.START_TIME AS START_TIME
     ,T.STATEMENT_HASH AS STATEMENT_HASH
   FROM
     SYS.M_EXPENSIVE_STATEMENTS AS T /* RDS_SOURCE :=
TH_EXPENSIVE_STATEMENTS */
       WHERE
504 {     ( T.START_TIME >= CAST( '2015-11-24 10:26:00' AS TIMESTAMP )
          AND T.START_TIME < CAST( '2015-11-25 10:26:31' AS TIMESTAMP ) )
   ) AS AGGR_ACCESS /* RDS_SOURCE := A$TH_EXPENSIVE_STATEMENTS */
GROUP BY
   AGGR_ACCESS.HOST
   ,AGGR_ACCESS.PORT
   ,AGGR_ACCESS.START_TIME
   ,AGGR_ACCESS.STATEMENT_HASH
) AS T2 /* RDS_SOURCE := A$TH_EXPENSIVE_STATEMENTS */
ON ( T1.HOST = T2.HOST AND T1.PORT = T2.PORT AND T1.STATEMENT_HASH =
T2.STATEMENT_HASH )
) AS SQ_SOURCE /* RDS_SOURCE := SQ_STD_AGGR */
```
*Continued on FIG. 5C*

*Continued from FIG. 5B*

```
      SELECT
    GROUP BY
      SQ_SOURCE.IS_EXPENSIVE
      ,SQ_SOURCE.SERVER_TIMESTAMP
      ,SQ_SOURCE.STATEMENT_HASH
    ) AS SQ_STD_AGGR /* RDS_SOURCE :=
SQ_EXC_AGGR */
  GROUP BY
    SQ_STD_AGGR.IS_EXPENSIVE
    ,SQ_STD_AGGR.STATEMENT_HASH
  ) AS DATAPROV /* RDS_SOURCE :=
DO_PROVIDER_SOURCE_BRIDGE */
```

DEEP FILTER PROPAGATION USING EXPLICIT DEPENDENCY AND EQUIVALENCY DECLARATIONS IN A DATA MODEL

BACKGROUND

The present disclosure relates to the generation of queries used to obtain results from databases.

Systems and databases can handle requests for data, such as database queries. For example, a query that is entered by a user, or a query that is formulated based on user inputs or based on other inputs, can be generated and run against a relational database, such as using a relational database management system (RDBMS). In some cases, queries can be formulated at runtime. Depending on the inputs on which the queries are based, the queries can be very complex. For example, a complex query can result from information associated with end user input such as filter or drilldown settings. In some cases, queries can contain, for example, complex combinations of unions and joins of multiple database tables or stacked combinations of modeled data sources that potentially make a query complex. Regardless of the complexity of a query, an end user may expect a prompt response from an associated system that handles the query.

SUMMARY

The disclosure generally describes computer-implemented methods, software, and systems for defining and using dependencies and equivalences for data elements in the data model in order to improve query efficiency. At design time, dependencies and equivalences for data elements are defined in the data model. The dependencies and equivalences are stored in persistent storage with the data model, applicable at runtime. A request for data is received over the computer network. Such a request typically results in a sub-optimal query not necessarily considering dependencies and equivalences to obtain results from a database. An optimized query is generated based on the received request and making use of dependencies and equivalences.

The subject matter described in this specification can be implemented in particular implementations so as to realize one or more of the following advantages. With explicit declaration of dependencies and equivalences in data models, optimizations can be incorporated into data requests at runtime, prior to their actual execution. This can lead to faster and less volatile response times, less resource consumption during data retrieval, and more reliable and efficient execution plans. Significant enrichment of data modeling capabilities can potentially also lead to faster query executions through optimized execution plans.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 2A-2B collectively list example data model design code for a data model.

FIGS. 3A-3B collectively list example data model design code for a special data model in which dependency and equivalency declarations are used.

FIGS. 4A-4C collectively list example code for a request associated with the data model of FIGS. 2A-2B.

FIGS. 5A-5C collectively list example code for a request associated with the special data model of FIGS. 3A-3B.

DETAILED DESCRIPTION

Figure 1:
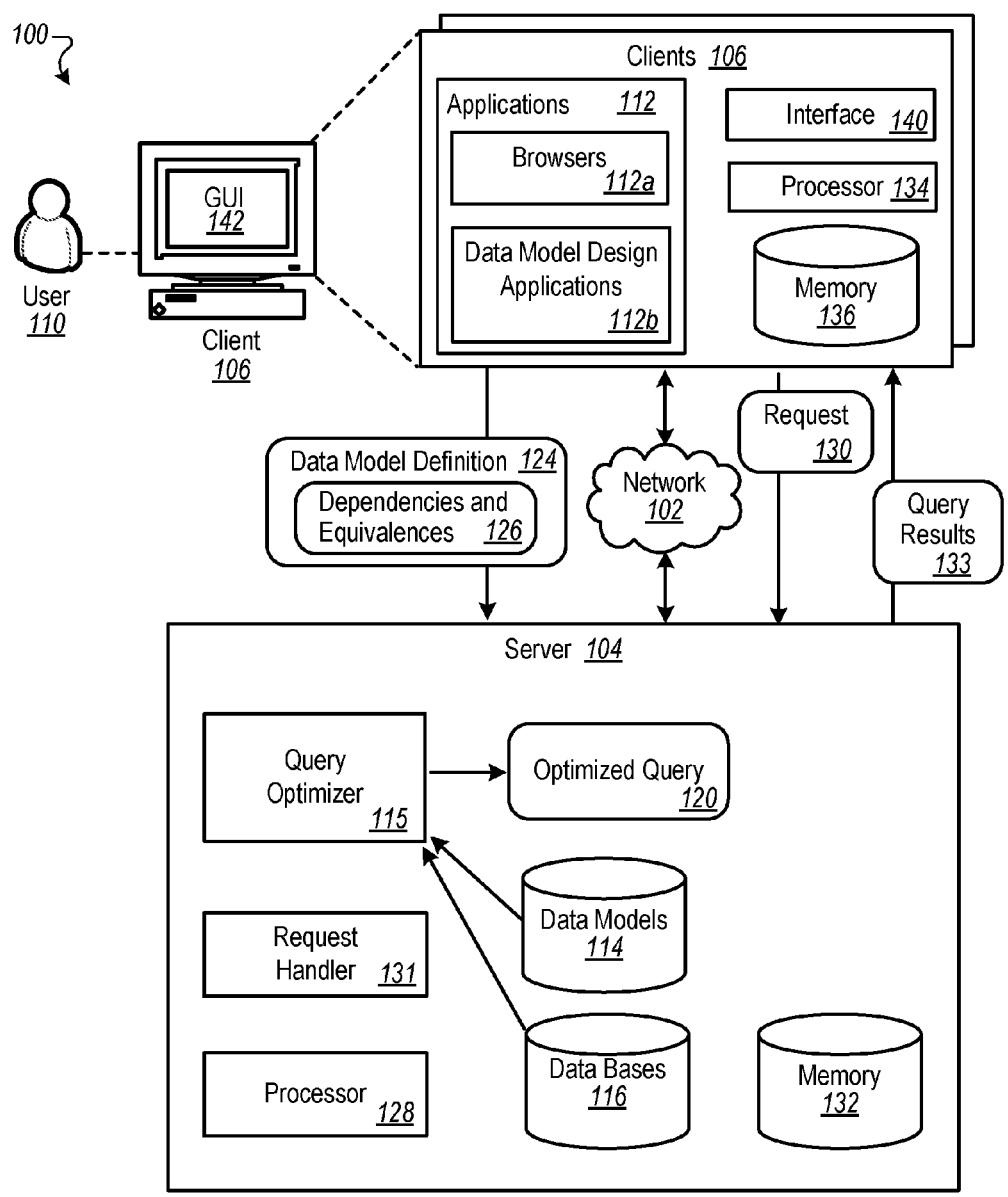
FIG. 1 is a block diagram of an example system for propagating filters using explicit dependency and equivalency declarations in a data model.

This disclosure generally describes computer-implemented methods, software, and systems for using dependency and equivalency declarations in a data model. These types of features can be used, for example, to optimize an original data request and help to ensure fast response times and an improved user experience, e.g., with reduced latency. For example, a query that is based on the data model can be generated, including using the dependency and equivalency declarations, to produce a form of the query that can be processed more efficiently.

In some implementations, data that is the target of a query can be distributed among various data sources of connected systems, with data elements within the data sources having associations among each other. The associations may include relationships such as dependencies and equivalences among fields (e.g., columns in database tables). In a relational data model, for example, foreign keys can be used to represent and/or implement such associations between different data sources. If such associations are not described in a data model, for example, filter settings cannot be pushed down appropriately along join branches. As a potential consequence, a data request may become unnecessarily more complex and may process much more data than actually needed because the filters are not applied appropriately.

In some implementations, expressions can be used to implement calculations and aggregations within data models. Examples of simple expressions can include renaming (for example, m1 AS m), aggregation (for example, SUM (m1) AS m), and logical expressions (for example, 0 when m1<0 else m1 AS m). Other options for use in calculating complex expressions can include routines (e.g., stored procedures) and user-defined functions.

In some implementations, when a data request such as a query is received, a database optimizer can be responsible for ensuring, for example, that only relevant data is evaluated in a backend system. The database optimizer can also push filters down as deeply as possible (e.g., closer to data extraction, such as from a table, and before joins), even though the data request itself does not force such a pushdown. A typical database optimizer can also be capable of identifying which information at the lower end of the process chain needs to be propagated upwards to feed all exposed expressions. While performing such an analysis, the optimizer may decide, for example, to push down filters that have been set.

However, if data requests become highly complex, calculating an optimal access plan can also become challenging and potentially sub-optimal. Typical cost-based optimizers may also have a timeout limit for plan calculation. In some implementations, if the plan calculation cannot be finished within a threshold time limit, it may become more likely that the optimizer will choose an access plan that is less than optimal. For example, without external guidance, filters may not be pushed down at all, even though that would be most appropriate. With this in mind, it is desirable to explicitly force the pushing down of filter settings, e.g., include the information along with an original data request. Doing so can reduce the reliance on subsequent optimization capabilities and the rewrite of data requests.

In some implementations, definition of data models can include allowing for the declaration of equivalences and dependencies between columns (e.g., characteristics and/or metrics) in a data model at design time. In examples provided below, two definitions of data models are provided, one with and one without an explicit declaration of equivalences and dependencies. Example queries associated with the two data models are also provided, in order to illustrate efficiencies that can be realized using equivalences and dependencies.

FIG. 1 is a block diagram of an example environment 100 for propagating filters using explicit dependency and equivalency declarations in a data model. The illustrated environment 100 includes, or is communicably coupled with, at least one server 104 and plural clients 106, all connected using a network 102. The environment 100 can be used, for example, to provide and support applications on the one or more clients 106 using data from databases managed by the server 104 (e.g., a database management system (DBMS)). The applications can include, for example, applications for designing data models and applications for submitting queries (e.g., browsers). Each client 106 comprises an electronic computing device operable to provide information to a user, e.g., using data (e.g., from databases 116) from the server 104, and potentially from other sources, for display on web pages and/or for other uses.

The environment 100 can serve several purposes. For example, a user designing a data model can provide, at design time of a data model (e.g., associated with databases 116), dependencies and equivalences for data elements (e.g., columns in a relational database or expressions on columns in the relational database) in the data model that are received over a computer network. For example, dependencies and equivalences that can be included in code segment that is defined when the data model is designed. The dependencies and equivalences are stored in persistent storage with the data model, e.g., in a data store of data models 114. At a later time, a request, such as a query or other data request, can be received over the computer network. For example, a query can be generated and executed to obtain query results from a database 116 associated with the data model 114. An optimized query, for example, can be generated using the received data query and using the dependencies and equivalences.

At a high level, the server 104 comprises an electronic computing device operable to store and provide access to data objects for use by the plural clients 106. A data model 114, for example, can be used by (and/or implemented in) a database management system (DBMS) for one or more specific databases 116. In some implementations, there can be plural data models 114, each associated with one or more databases 116. For example, when there are multiple co-operating auto-save caches, one cache can be a master that assumes a coordination/delegation role. In some implementations, the data store of databases 116 can be stored or distributed in plural locations, e.g., at the server 104 and/or other locations.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. Indeed, the server 104 and the clients 106 may be any computer or processing device. In some implementations, the server 104 may be distributed in different locations and coupled using the network 102.

The server 104 includes a processor 128 and memory 132. Although illustrated as the single processor 128 in FIG. 1, two or more processors 128 may be used according to particular needs, desires, or particular implementations of the environment 100. Generally, the processor 128 executes instructions and manipulates data to perform the operations of the server 104. Specifically, the processor 128 executes the functionality required to receive and process requests from the server 104. In some implementations, the memory 132 can store the database 116 and the data model 114.

The memory 132 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104.

Each client 106 of the environment 100 may be any computing device operable to connect to, or communicate with, other systems via a local DB or via the network 102 using a wire-line or wireless connection. In general, each client 106 comprises an electronic computer device operable to receive, transmit, process, and store any appropriate data associated with the environment 100 of FIG. 1.

The request handler 131, e.g., can handle requests received from the clients 106, e.g., for data to be provided from one or more databases 116, and for user inputs that are to be stored using the data model 114. In some implementations, the database 116 can be implemented using one or more relational databases and/or other storage structures, and the stored data may be stored locally or distributed.

The illustrated client 106 further includes a processor 134, a memory 136, applications 112 (e.g., a browser), and an interface 140. The interface 140 is used by the client 106 for communicating with other systems in a distributed environment—including within the environment 100—connected to the network 102, e.g., other systems communicably coupled to the network 102 (not illustrated). Generally, the interface 140 comprises logic encoded in software and/or hardware in a suitable combination and operable to communicate with the network 102. More specifically, the interface 140 may comprise software supporting one or more communication protocols associated with communications such that the network 102 or interface's hardware is operable to communicate physical signals within and outside of the illustrated environment 100.

Applications 112, including a browser 112a and a data model design application 112b) can receive and provide information to the users 110 on each of the respective clients 106. As an example, in order to update a web page displayed in a browser on the client 106, the application 112 can provide a request for data from one or more databases 116 managed by the server 104. An example request 130 entered by the user 110 using the browser 112a can be used to generate query results 133 from the data bases 116. Requests, including requests to store data model definitions, can come from the data model design application 112b, for example, which can receive input from a user who is designing a data model to be stored in persistent storage of the data models 114.

The data model design application 112b can allow the user 110 to design data models, and as such, data model definitions 124 can be provided by the client 106 for storage at the server 104. The data model definitions 124 can include dependencies and equivalences 126, described herein and used, by a query optimizer 118 at the server to create an optimized query 120, an example of which is described with reference to FIGS. 5A-5C.

As illustrated in FIG. 1, the client 106 includes the processor 134. Although illustrated as the single processor 134 in FIG. 1, two or more processors 134 may be used according to particular needs, desires, or particular implementations of the environment 100. Generally, the processor 134 executes instructions and manipulates data to perform the operations of the client 106. Specifically, the processor 134 executes the functionality required to send requests to the server 104 and to receive and process responses from the server 104.

The illustrated client 106 also includes a memory 136. The memory 136 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 106.

The illustrated client 106 comprises a graphical user interface (GUI) 142, as shown with respect to and included by the client 106. The GUI 142 interfaces with at least a portion of the environment 100 for any suitable purpose, including user interface screens that display information associated with databases 116, allow queries to submitted, and allow data models to be designed, for example. For example, the user interface screens can provide user entry fields and/or other user entry controls for which a user can provide user inputs, e.g., through the applications 112. User inputs can include, for example, textual input, selections from controls (e.g., menus, lists, options or other elements), navigation commands (e.g., cursor/mouse movements), and/or complex structures (e.g., files, images, sounds, videos). In some implementations, user inputs can be associated with a context, e.g., a particular state or segment of an application.

FIGS. 2A-2B collectively list example data model design code 200 for a data model. The example data model design code 200 does not include dependency and equivalency declarations.

FIGS. 3A-3B collectively list example data model design code 300 for a special data model in which dependency and equivalence declarations are used. For example, in addition to the same data model semantics as provided above for the data model design code 200, the data model design code 300 includes an explicit declaration of dependencies for the exposed column SERVER_TIMESTAMP. For example, code segment 302 (highlighted with bolding) includes an equivalence between T1.SERVER_TIMESTAMP and T2.START_TIME for SERVER_TIMESTAMP. For clarity of presentation, data model design code 200 and 300 are split into multiple figures at the same lines of code, so that code segments in FIGS. 2B and 3B are identical.

FIGS. 4A-4C collectively list example code 400 for a request associated with the data model of FIGS. 2A-2B. For example, using the data model design code 200, the example code 400 can be a data request, such as a SQL query, that is generated at runtime and does not include a deep propagation of time filters. Code segment 402 (highlighted with bolding) includes, for example, a time filter that is applied later to an intermediate result of a join operation in order to make the final result set match the desired time interval.

FIGS. 5A-5C collectively list example code 500 for a request associated with the special data model of FIGS. 3A-3B. For example, using the data model design code 300, the example code 500 can be SQL code for a data request that is generated at runtime and includes a deep propagation of time filters. In a code segment 502 (bolded), for example, the time filter is applied within the first join branch (identified by alias T1) according to the dependency declaration for T1.SERVER_TIMESTAMP. Additionally, in a code segment 504 (bolded), the time filter is applied within the second join branch (identified by alias T2) according to the equivalence declaration for T1.SERVER_TIMESTAMP and T2.START_TIME. For clarity of presentation, example code 400 and 500 are split into multiple figures at the same lines of code, so that code segments in FIGS. 4A and 5A are identical, and code segments in FIGS. 4C and 5C are identical.

In some implementations, an optimized execution plan of example code 500 can be calculated by a query optimizer and may be far less complex compared to the execution plan for example code 400, e.g., significantly reducing resulting execution time. The actual saved time, from an end user perspective, can depend at least on the number of records of the two source tables STATISTICS.HOST_SQL_PLAN_CACHE and SYS.M_EXPENSIVE_STATEMENTS and also on the specified time range.

Even though column TIMESTAMP_SERVER of alias T1 and column START_TIME of alias T2 have the same timestamp format, they are not necessarily equal at each time. As a result, there is no referential constraint defined in the database data model that the optimizer can use to push down the filters. Joining these columns in order to allow optimizers to push down filters is not possible, as it might cause the query to return no results at all.

In some implementations, another example of the same approach can include pushing down filters into parameters of stored procedures or functions. An optimizer typically has no knowledge about an algorithm inside a routine and therefore also has no knowledge about how the parameters influence the result set. By modelling the equivalencies of parameters to result set columns, the SQL generator can push down equal filters as well. As a result, a routine can internally filter the processed data, which can be more efficient than applying filters afterwards.

Figure 6A:
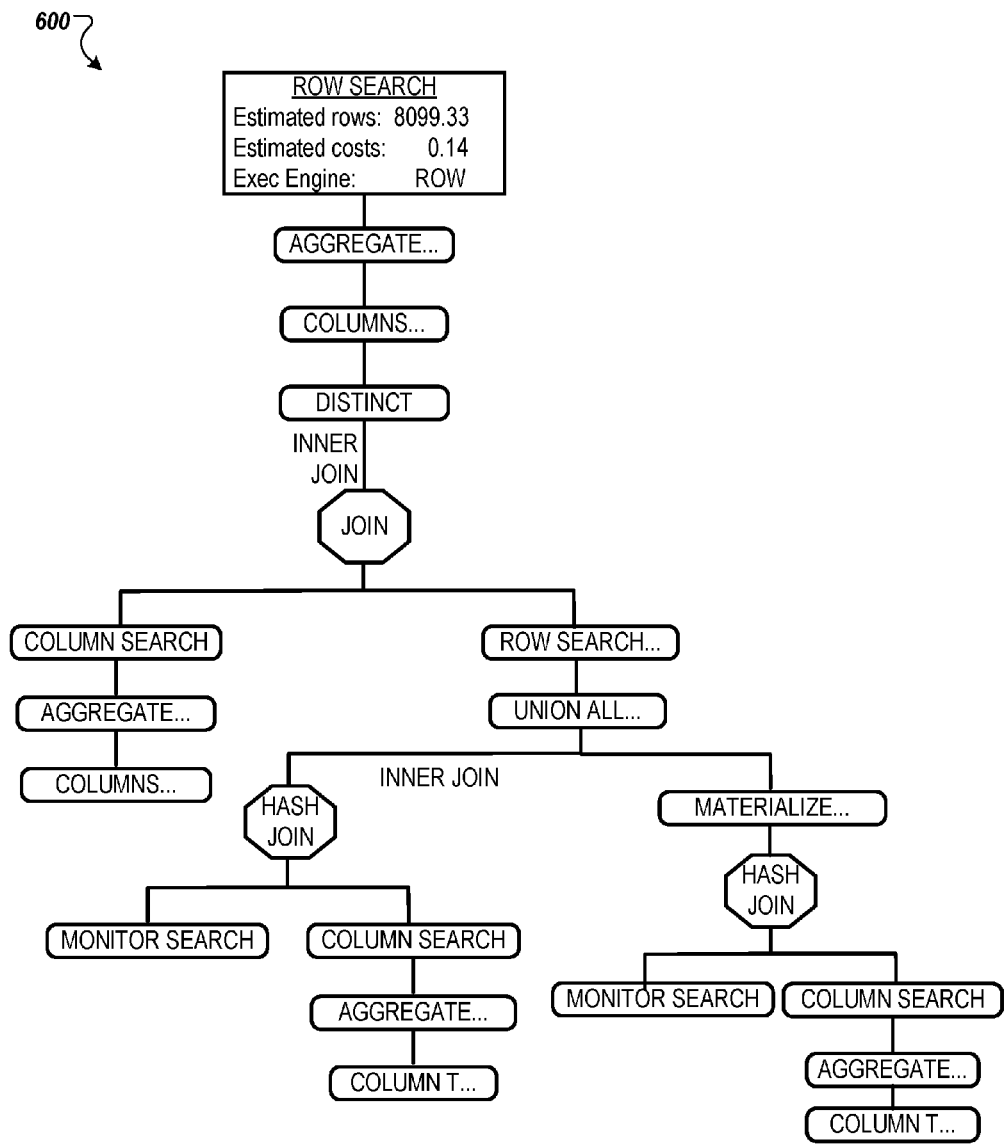
FIGS. 6A and 6B show example optimized execution plans for the example code of FIGS. 4A-4C and 5A-5C, respectively.
Figure 6B:
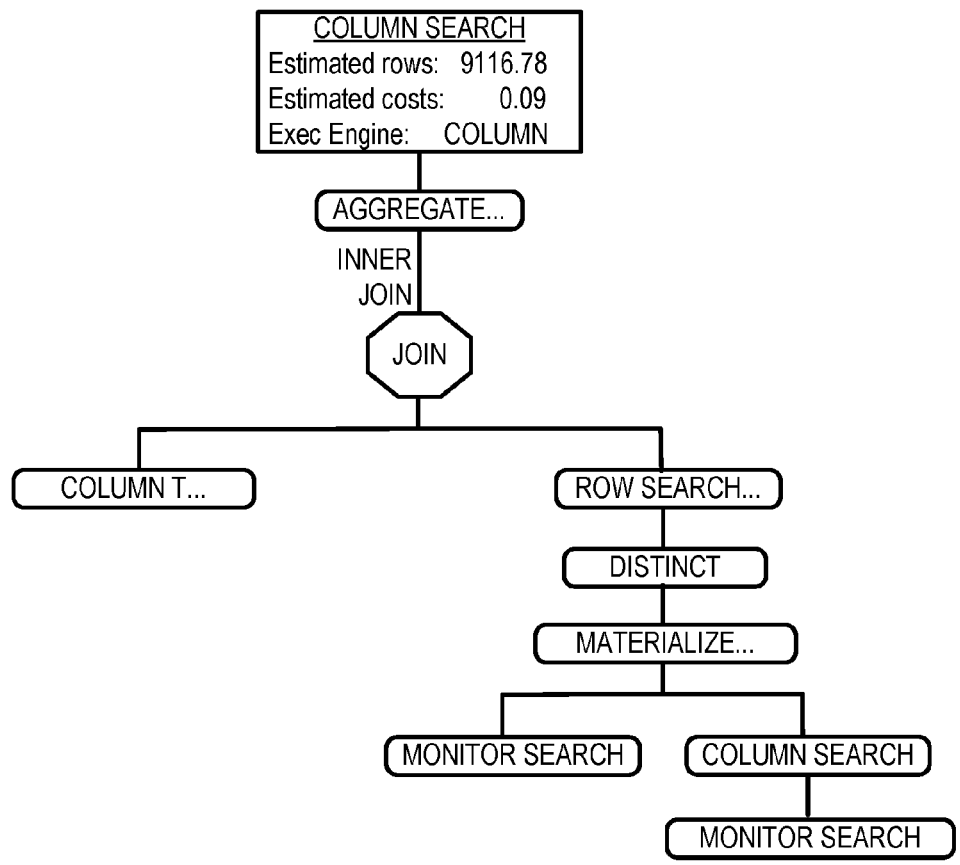

FIGS. 6A and 6B show example optimized execution plans 600 and 650 for the example code 400 and 500 of FIGS. 4A-4C and 5A-5C, respectively. Because of the use of equivalences and dependencies, the optimized execution plan 650 is far less complex as compared to the optimized execution plan 600. Further, an estimated execution time (e.g., 0.09 seconds) is reduced for the example code 500 as compared to the estimated execution time (e.g., 0.14 seconds) for the example code 400. The amount time that is actually saved from an end user perspective can depend on a number of records that are contained in the two source tables STATISTICS.HOST_SQL_PLAN_CACHE and SYS.M_EXPENSIVE_STATEMENTS, and also on the specified time range.

Figure 7:
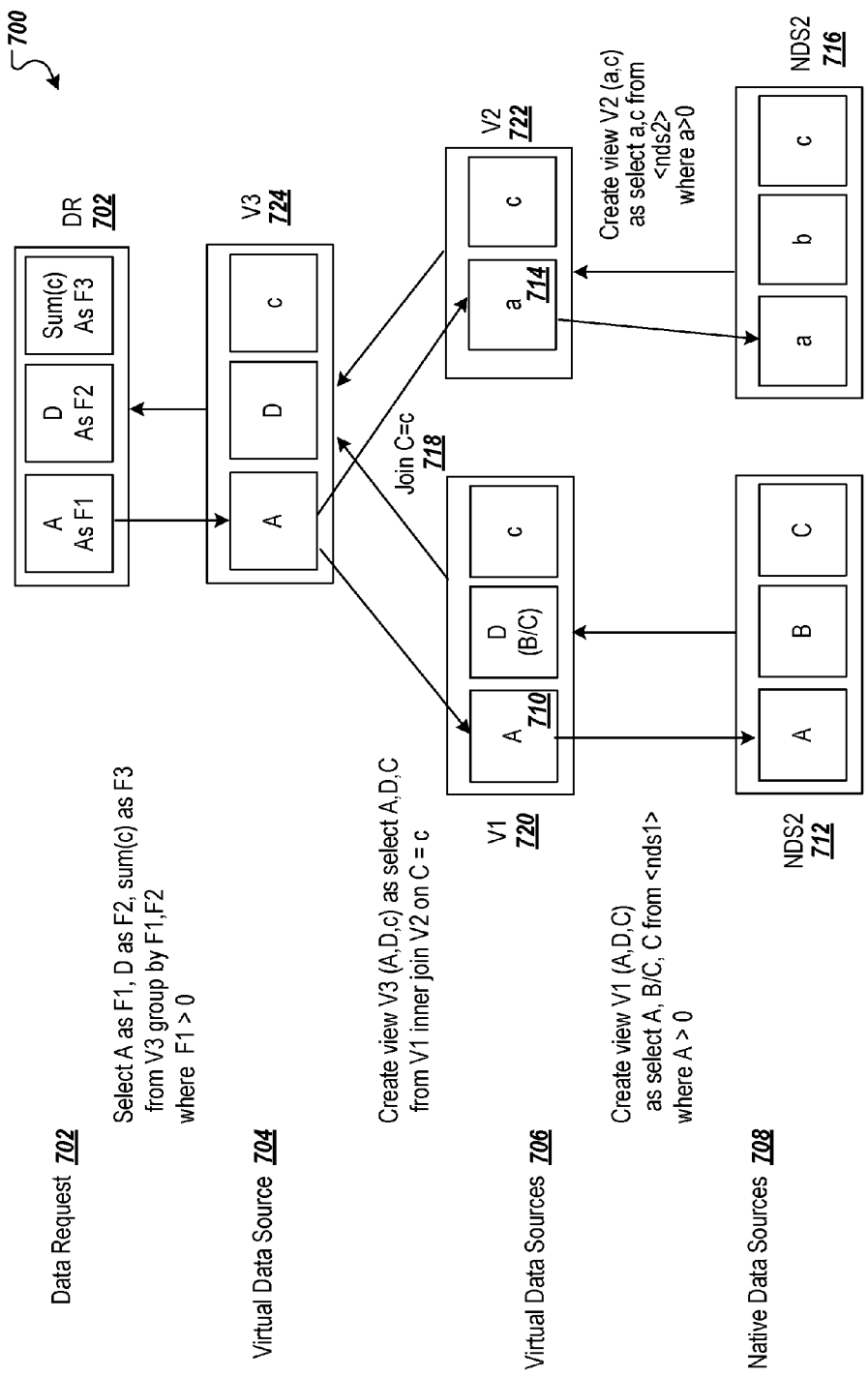
FIG. 7 shows an example query execution path.

FIG. 7 shows an example query execution path 700. The execution path includes a data request 702 in which a data element A is selected as part of a SQL query. A virtual data source 704 defines A along with other data elements D and c that are also part of the data request 702. As part of execution of the data request 702, a join 718 is performed on virtual data sources 706 for view V1 720 and view V2 722. View V3 724, for example, is a view that incorporates the view V1 720 and the view V2 722, e.g., for data elements A 710 and element "a" 714, respectively. Native data sources 708, including native data source 1 712 and native data source 2 716, include A 710 and element "a" 714. If dependencies and equivalences are established for the data model for the database associated with the query execution path 700, for example, the query can be more efficient, with respect to A 710 and element "a" 714.

Figure 8:
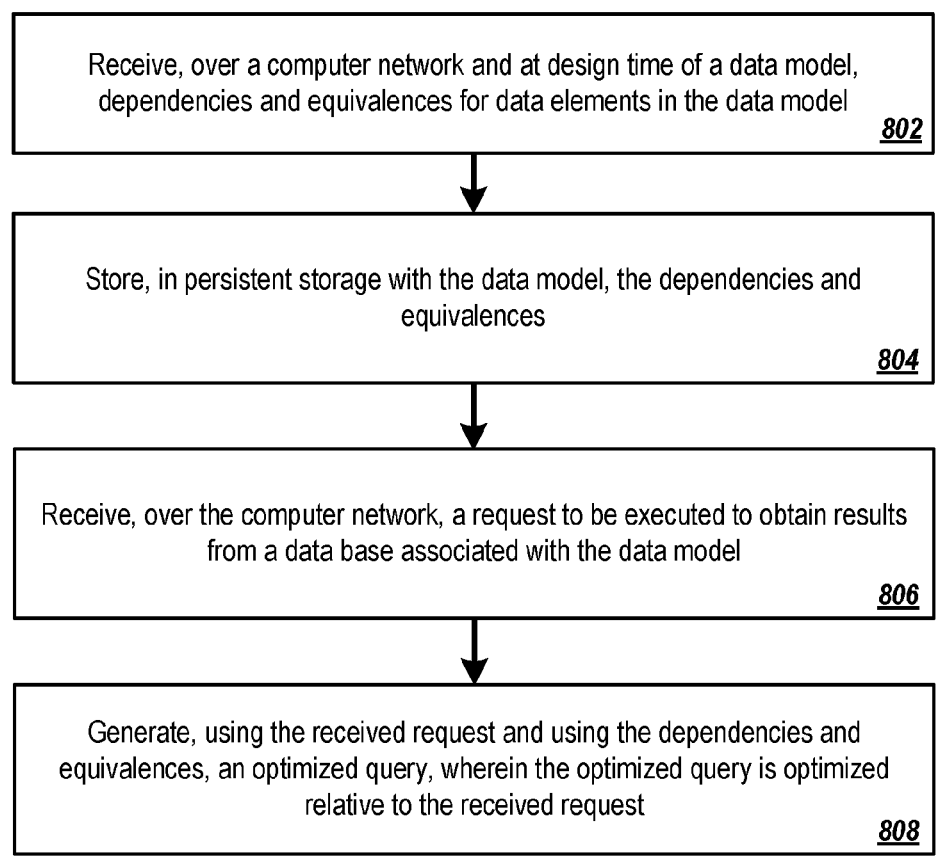
FIG. 8 is a flowchart of an example method for updating an application.

FIG. 8 is a flowchart of an example method 800 for updating an application. For clarity of presentation, the description that follows generally describes method 800 in the context of FIGS. 1-5C.

At 802, at design time of a data model, dependencies and equivalences for data elements in the data model are received over a computer network. For example, dependencies and equivalences that are included in code segment 302 can be defined when the data model associated with data model design code 300 is designed. In some implementations, dependencies and equivalences can be defined at some time after the design of the data model.

At 804, the dependencies and equivalences are stored in persistent storage with the data model. For example, the server 104 can receive the data model definitions 124 and the dependencies and equivalences 126 from the client 106 for persistent storage at the server 104.

At 806, a request is received over the computer network, the query to be executed to obtain query results from a database associated with the data model. For example, the server 104 can receive the request 130 from the client 106.

At 808, an optimized query is generated using the received request and using the dependencies and equivalences. The optimized query is optimized relative to the received request. For example, using information from the data model 114, the query optimizer 115 can generate the optimized query 120. An example of an optimized query can be the example code 500 described above with reference to FIGS. 5A-5C.

In some implementations, the method 800 can further include executing the optimized query in place of the received request. For example, the server 104 can execute the optimized query 120 instead of the received request 130.

In some implementations, generating the optimized query includes moving query elements to a new position in the optimized query that makes the optimized query more run-time efficient than the received request. For example, the query optimizer 115 can re-arrange elements such as the code segments 502 and the 504 to appear in different locations as compared to the code segment 402.

In some implementations, moving the query elements to the new position in the optimized query includes pushing the query elements to a lower position in the optimized query relative to a non-optimized position in the query. For example, as described above with reference to FIGS. 5A-5C, in the code segment 504, the time filter is applied within the second join branch (identified by alias T2) according to the equivalence declaration for T1.SERVER_TIMESTAMP and T2.START_TIME. This is a "lower" position in the optimized query because the code is in a deeper nested portion of the example code 500. In some implementations, the query elements that are moved are normal filters or semantically equivalent filters, including table joins, function parameters, and procedure parameters.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
at design time of a data model and prior to receiving, over a computer network, a request to be executed to obtain results from a database associated with the data model:
receiving, over the computer network, a set of dependencies and equivalences for data elements in the data model; and
incorporating the received set of dependencies and equivalences in the data model to generate an updated data model; and
at query time:
receiving, over the computer network, the request to be executed to obtain results from the database associated with the updated data model; and
generating, using the received request and using the dependencies and equivalences received at design time and incorporated into the updated data model, an optimized query, wherein the optimized query is optimized relative to the received request.

2. The computer-implemented method of claim 1, further comprising executing the optimized query in place of the received request.

3. The computer-implemented method of claim 1, wherein the data elements are columns in a database or expressions on columns in the database.

4. The computer-implemented method of claim 1, wherein generating the optimized query includes moving query elements to a new position in the optimized query that makes the optimized query more run-time efficient than the received request.

5. The computer-implemented method of claim 4, wherein moving the query elements to the new position in the optimized query includes pushing the query elements to a lower position in the optimized query relative to a non-optimized position in the query.

6. The computer-implemented method of claim 5, wherein the query elements that are moved are normal filters or semantically equivalent filters, including table joins, function parameters, and procedure parameters.

7. The computer-implemented method of claim 1, wherein the set of dependencies and equivalences is included in a code segment, and wherein the code segment is defined during the design of the data model associated.

8. The computer-implemented method of claim 7, wherein the set of dependencies and equivalences can be modified after the design of the data model, prior to receiving the request.

9. A system comprising:
memory storing databases and data models associated with the databases; and
one or more processors performing operations, using the memory, the operations including:
at design time of a data model and prior to receiving, over a computer network, a request to be executed to obtain results from a database associated with the data model:
receiving, over a computer network, the set of dependencies and equivalences for data elements in the data model; and
incorporating the received set of dependencies and equivalences in the data model to generate an updated data model; and
at query time:
receiving, over the computer network, the request to be executed to obtain results from the database associated with the updated data model; and
generating, using the received request and using the dependencies and equivalences received at design time and incorporated into the updated data model, an optimized query, wherein the optimized query is optimized relative to the received request.

10. The system of claim 9, the operations further comprising executing the optimized query in place of the received request.

11. The system of claim 9, wherein the data elements are columns in a database or expressions on columns in the database.

12. The system of claim 9, wherein generating the optimized query includes moving query elements to a new position in the optimized query that makes the optimized query more run-time efficient than the received request.

13. The system of claim 12, wherein moving the query elements to the new position in the optimized query includes pushing the query elements to a lower position in the optimized query relative to a non-optimized position in the query.

14. The system of claim 13, wherein the query elements that are moved are normal filters or semantically equivalent filters, including table joins, function parameters, and procedure parameters.

15. A non-transitory computer-readable media encoded with a computer program, the program comprising instructions that when executed by one or more computers cause the one or more computers to perform operations comprising:
at design time for a data model and prior to receiving, over a computer network, a request to be executed to obtain results from a database associated with the data model:
receiving, over the computer network, a set of dependencies and equivalences for data elements in the data model; and
incorporating the received set of dependencies and equivalences in the data model to generate an updated data model; and at query time:

receiving, over the computer network, the request to be executed to obtain results from the database associated with the updated data model; and generating, using the received request and using the dependencies and equivalences received at design time and incorporated into the updated data model, an optimized query, wherein the optimized query is optimized relative to the received request.

16. The non-transitory computer-readable media of claim 15, the operations further comprising executing the optimized query in place of the received request.

17. The non-transitory computer-readable media of claim 15, wherein the data elements are columns in a database or expressions on columns in the database.

18. The non-transitory computer-readable media of claim 15, wherein generating the optimized query includes moving query elements to a new position in the optimized query that makes the optimized query more run-time efficient than the received request.

19. The non-transitory computer-readable media of claim 18, wherein moving the query elements to the new position in the optimized query includes pushing the query elements to a lower position in the optimized query relative to a non-optimized position in the query.

20. The non-transitory computer-readable media of claim 19, wherein the query elements that are moved are normal filters or semantically equivalent filters, including table joins, function parameters, and procedure parameters.

\* \* \* \* \*